(12) United States Patent
Wu et al.

(10) Patent No.: US 9,922,530 B2
(45) Date of Patent: Mar. 20, 2018

(54) METHOD AND DEVICE FOR GENERATING INFORMATION

(71) Applicant: Xiaomi Inc., Beijing (CN)

(72) Inventors: Ke Wu, Beijing (CN); Xinyu Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/162,083

(22) Filed: May 23, 2016

(65) Prior Publication Data

US 2017/0053516 A1 Feb. 23, 2017

(30) Foreign Application Priority Data

Aug. 18, 2015 (CN) .......................... 2015 1 0509014

(51) Int. Cl.

| G08B 21/24 | (2006.01) |
|---|---|
| G09B 19/00 | (2006.01) |
| G08B 21/18 | (2006.01) |
| H04L 12/28 | (2006.01) |
| G06Q 30/06 | (2012.01) |
| G06Q 10/08 | (2012.01) |

(52) U.S. Cl.
CPC ........... *G08B 21/24* (2013.01); *G06Q 10/087* (2013.01); *G06Q 30/0633* (2013.01); *G08B 21/182* (2013.01); *G09B 19/0092* (2013.01); *H04L 12/2829* (2013.01); *H04L 2012/285* (2013.01); *H04L 2012/2841* (2013.01)

(58) Field of Classification Search
CPC .......... H04L 2012/285; H04L 12/2829; G08B 21/24; G08B 21/182; G06Q 10/087; G06Q 30/0633; G09B 19/0092; F25D 2700/06; F25D 2700/08

USPC ....... 340/539.1, 539.11, 539.23, 3.1; 62/125; 705/26.7, 28; 715/769, 771
See application file for complete search history.

(56) References Cited

U.S. PATENT DOCUMENTS

| 6,204,763 B1 | 3/2001 | Sone |
|---|---|---|
| 8,429,026 B1 * | 4/2013 | Kolawa ................. G06Q 30/00 705/26.7 |

(Continued)

FOREIGN PATENT DOCUMENTS

| CN | 1536307 A | 10/2004 |
|---|---|---|
| CN | 102706093 A | 10/2012 |

(Continued)

OTHER PUBLICATIONS

International Search Report and Written Opinion dated May 5, 2016 in PCT/CN2015/099046 (with English language translation).
Written Opinion dated May 5, 2016 in PCT/CN2015/099046 (with English language translation).
Extended European Search Report dated Dec. 22, 2016 in Patent Application No. 16178461.6.

(Continued)

*Primary Examiner* — Hung T Nguyen
(74) *Attorney, Agent, or Firm* — Oblon, McClelland, Maier & Neustadt, L.L.P.

(57) ABSTRACT

The disclosure relates to a method and device for generating information. The method includes acquiring first information related to an amount of at least one food item remaining in a refrigerator; acquiring a rate of consumption of the at least one food item; calculating a number of meal servings of the at least one food item based on the first information and the rate of consumption; and generating a reminder message when the number of meal servings is less than a threshold number of meal servings.

18 Claims, 13 Drawing Sheets

(56) References Cited

U.S. PATENT DOCUMENTS

| | | | |
|---|---|---|---|
| 8,629,753 B2* | 1/2014 | Yum | F25D 29/00 340/3.1 |
| 9,043,033 B2 | 5/2015 | Kim et al. | |
| 2002/0178066 A1* | 11/2002 | Roh | G06Q 30/06 705/22 |
| 2006/0178947 A1* | 8/2006 | Zsigmond | B07C 5/34 705/26.1 |
| 2012/0101876 A1 | 4/2012 | Turvey et al. | |
| 2012/0260683 A1* | 10/2012 | Cheon | F25D 29/00 62/125 |
| 2012/0265348 A1* | 10/2012 | Kim | F25D 17/042 700/275 |
| 2013/0067375 A1* | 3/2013 | Kim | F25D 29/00 715/769 |
| 2013/0214935 A1* | 8/2013 | Kim | G08C 17/02 340/870.02 |
| 2014/0304126 A1* | 10/2014 | Kim, II | G06Q 10/087 705/28 |
| 2015/0002660 A1 | 1/2015 | Lee et al. | |
| 2015/0149298 A1 | 5/2015 | Tapley | |

FOREIGN PATENT DOCUMENTS

| | | |
|---|---|---|
| CN | 102889747 A | 1/2013 |
| CN | 103363751 A | 10/2013 |
| CN | 104050531 A | 9/2014 |
| CN | 104279835 A | 1/2015 |
| CN | 105091499 A | 11/2015 |
| JP | H10-316210 A | 12/1998 |
| JP | 2004-005027 A | 1/2004 |
| JP | 2005-276171 A | 10/2005 |
| WO | 2014/168265 A1 | 10/2014 |
| WO | WO 2015/077637 A1 | 5/2015 |

OTHER PUBLICATIONS

Office Action dated Mar. 14, 2017, in Chinese Patent Application No. 201510509014.0.
Office Action dated Oct. 24, 2017, in Japanese Patent Application No. 2016-536135 (with English language translation).

* cited by examiner

METHOD AND DEVICE FOR GENERATING INFORMATION

CROSS-REFERENCE TO RELATED APPLICATIONS

This application is based on and claims a priority to Chinese Patent Application Serial No. CN 201510509014.0, filed with the State Intellectual Property Office of P. R. China on Aug. 18, 2015, the entire contents of which are incorporated herein by reference.

TECHNICAL FIELD

The present disclosure relates to the field of smart homes, and more particularly to a method and device for generating information.

BACKGROUND

A refrigerator is a common household appliance that is generally used by people to store food and other perishable products. For example, a user may place purchased food into the refrigerator for low temperature storage, so as to extend the storage duration of the food. The user, however, is typically unable to determine an amount of food remaining in the refrigerator and may consequently find the refrigerator lacking in a specific food item or ingredient required during cooking.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for generating information. The method includes acquiring first information related to an amount of at least one food item remaining in a refrigerator; acquiring a rate of consumption of the at least one food item; calculating a number of meal servings of the at least one food item based on the first information and the rate of consumption; and generating a reminder message when the number of meal servings is less than a threshold number of meal servings.

The first information related to the amount of the at least one food item includes a type of the at least one food item and the amount of the at least one food item remaining in the refrigerator. When acquiring the first information, the method includes determining the type of the at least one food item based on an image from inside the refrigerator acquired by a camera disposed in the refrigerator; and determining the amount of the at least one food item stored in at least one storage region of the refrigerator based on one or more of (i) the image from inside the refrigerator acquired by the camera, and (ii) pressure data acquired by a pressure sensor disposed in the at least one storage region.

When acquiring the rate of consumption, the method includes acquiring habit information of a user based on a history record of food consumption, the habit information indicating a single serving amount and a serving frequency of a designated food consumed by the user; and determining the rate of consumption based on the single serving amount and the serving frequency.

When acquiring the rate of consumption, the method also includes acquiring habit information of a user based on a history record of food consumption, the habit information indicating a single serving amount and a serving frequency of a designated food consumed by the user; and determining the rate of consumption based on the single serving amount and the serving frequency.

The method also includes acquiring a first number of diners; and modifying the rate of consumption based on the first number of diners and a standard serving amount of the at least one food item.

When acquiring the first number of diners, the method also includes at least one of: a first manner of acquiring the first number of diners by (i) acquiring diner information from an image acquired by a camera, the camera being attached to the refrigerator or disposed outside of the refrigerator, and (ii) determining the first number of diners based on the diner information; a second manner of acquiring the first number of diners by (i) acquiring a number of mobile terminals connected to a home gateway device, and (ii) determining the first number of diners based on the number of mobile terminals; a third manner of acquiring the first number of diners by (i) acquiring visitor information in a terminal attached to the refrigerator, the visitor information including at least a number of visitors, and (ii) determining the first number of diners based on the number of visitors; a fourth manner of acquiring the first number of diners by (i) acquiring travel information in a terminal attached to the refrigerator, the travel information including a travel schedule, and (ii) determining the first number of diners based on the travel schedule; and a fifth manner of acquiring the first number of diners by (i) acquiring geographical location information of a mobile terminal attached to the refrigerator during a time period, the time period being a cooking period, (ii) determining that a user associated with the mobile terminal is a non-diner when the geographical location information indicates that a distance between the mobile terminal and the refrigerator is greater than a threshold distance, and (iii) determining the first number of diners based on the non-diner and a predetermined number of diners.

When generating the reminder message, the method also includes acquiring price information associated with the at least one food item; and adding the price information to the reminder message.

The method also includes determining a preferred food item of the user based on the habit information of the user; searching cooking parameters based on the preferred food item of the user, the cooking parameters including an amount of the preferred food item, a cooking apparatus, and a cooking operation parameter based on the cooking apparatus; and sending the cooking parameters to the cooking apparatus, the cooking apparatus being one of an electric cooker, an electromagnetic oven, a microwave oven, and an oven.

The method also includes acquiring a first storage duration of the at least one food item; and generating a serving reminder message for reminding a user to serve the at least one food item when the first storage duration reaches a threshold storage duration associated with the at least one food item.

The method also includes determining a storage state of the at least one food item via at least one of a camera and an odor sensor; and generating a clean-up reminder message for reminding a user to clean out the at least one food item when the storage state indicates that the at least one food item has expired.

Aspects of the disclosure also provide a device for generating information. The device includes a processor and a memory for storing instructions executable by the processor. The processor is configured to acquire first information related to an amount of at least one food item remaining in a refrigerator; acquire a rate of consumption of the at least one food item; calculate a number of meal servings of the at least one food item based on the first information and the rate of consumption; and generate a reminder message when the number of meal servings is less than a threshold number of meal servings.

The first information related to the amount of the at least one food item includes a type of the at least one food item and the amount of the at least one food item remaining in the refrigerator. The processor is configured to acquire the first information by determining the type of the at least one food item based on an image from inside the refrigerator acquired by a camera disposed in the refrigerator; and determining the amount of the at least one food item stored in at least one storage region of the refrigerator based on one or more of (i) the image from inside the refrigerator acquired by the camera, and (ii) pressure data acquired by a pressure sensor disposed in the storage region.

The processor is configured to acquire the rate of consumption by acquiring habit information of a user based on a history record of food consumption, the habit information indicating a single serving amount and a serving frequency of a designated food consumed by the user; and determining the rate of consumption based on the single serving amount and the serving frequency.

The processor is also configured to acquire the rate of consumption by acquiring habit information of a user based on a history record of food consumption, the habit information indicating a single serving amount and a serving frequency of a designated food consumed by the user; and determining the rate of consumption based on the single serving amount and the serving frequency.

The processor is also configured to acquire a first number of diners; and modify the rate of consumption based on the first number of diners and a standard serving amount of the at least one food item.

The processor is configured to acquire the first number of diners by at least one of: a first manner of acquiring the first number of diners by (i) acquiring diner information from an image acquired by a camera, the camera being attached to the refrigerator or disposed outside of the refrigerator, and (ii) determining the first number of diners based on the diner information; a second manner of acquiring the first number of diners by (i) acquiring a number of mobile terminals connected to a home gateway device, and (ii) determining the first number of diners based on the number of mobile terminals; a third manner of acquiring the first number of diners by (i) acquiring visitor information in a terminal attached to the refrigerator, the visitor information including at least a number of visitors, and (ii) determining the first number of diners based on the number of visitors; a fourth manner of acquiring the first number of diners by (i) acquiring travel information in a terminal attached to the refrigerator, the travel information including a travel schedule, and (ii) determining the first number of diners based on the travel schedule; and a fifth manner of acquiring the first number of diners by (i) acquiring geographical location information of a mobile terminal attached to the refrigerator during a time period, the time period being a cooking period, (ii) determining that a user associated with the mobile terminal is a non-diner when the geographical location information indicates that a distance between the mobile terminal and the refrigerator is greater than a threshold distance, and (iii) determining the first number of diners based on the non-diner and a predetermined number of diners.

The processor is configured to generate the reminder message by acquiring price information associated with the at least one food item; and adding the price information to the reminder message.

The processor is also configured to determine a preferred food item of the user based on the habit information of the user; search cooking parameters based on the preferred food item of the user, the cooking parameters including an amount of the preferred food item, a cooking apparatus, and a cooking operation parameter based on the cooking apparatus; and send the cooking parameters to the cooking apparatus, the cooking apparatus being one of an electric cooker, an electromagnetic oven, a microwave oven, and an oven.

The processor is also configured to acquire a first storage duration of the at least one food item; and generate a serving reminder message for reminding a user to serve the at least one food item when the first storage duration reaches a threshold storage duration associated with the at least one food item.

The processor is also configured to determine a storage state of the at least one food item via at least one of a camera and an odor sensor; and generate a clean-up reminder message for reminding a user to clean out the at least one food item when the storage state indicates that the at least one food item has expired.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to these skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
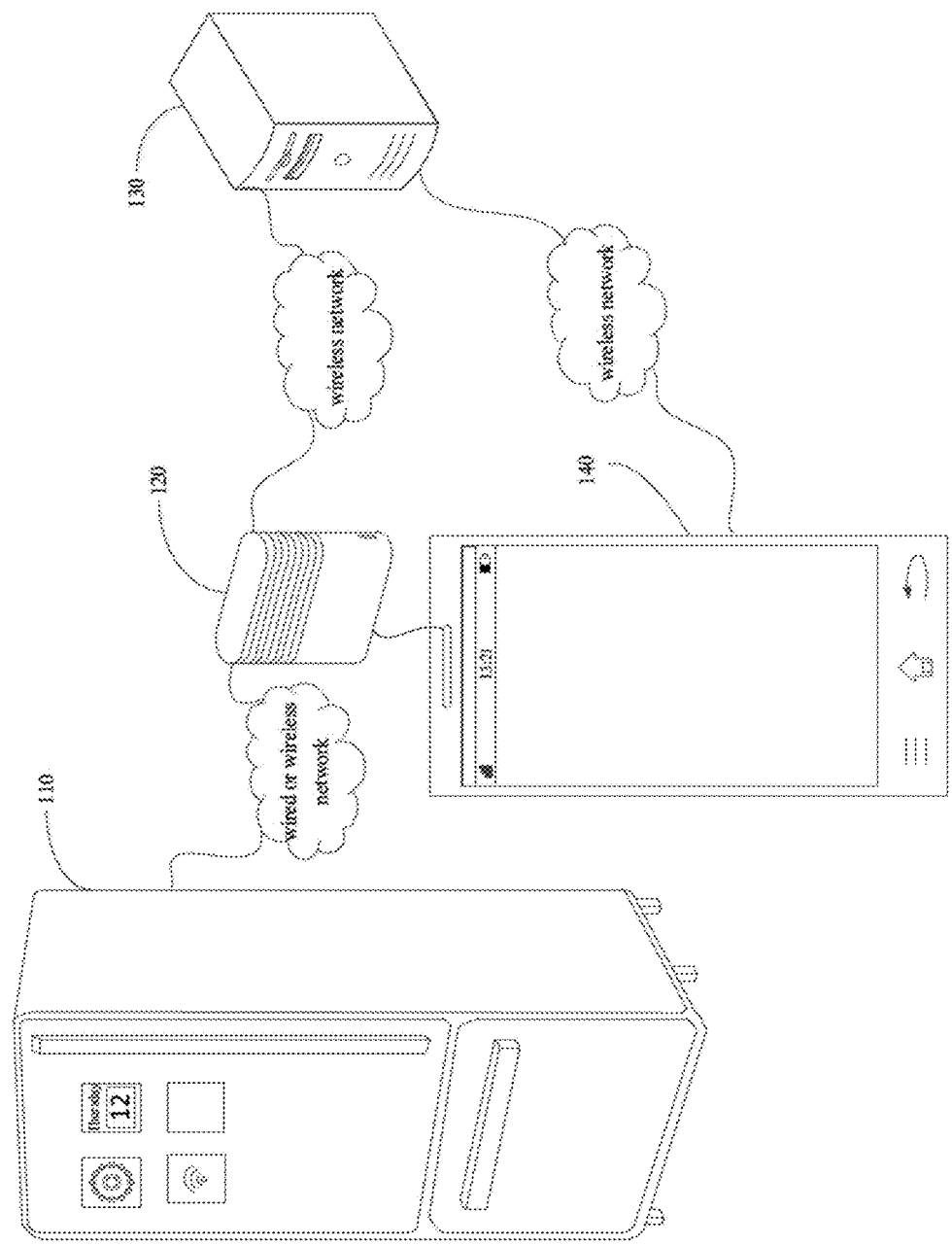
FIG. 1 is a schematic diagram illustrating an implementation environment of exemplary aspects of the present disclosure.

FIG. 1 is a schematic diagram illustrating an implementation environment of respective aspects of the present disclosure. Referring to FIG. 1, the implementation environment includes a refrigerator 110, a home gateway device 120, a background server 130 and a terminal 140.

There is at least one sensor disposed in the refrigerator 110. The sensor is configured to acquire food information of a food (e.g., at least one food item and/or ingredient) stored in the refrigerator 110. The sensor includes but not limited to a temperature sensor, a smell sensor, a pressure sensor and a light sensor. There may be at least one camera disposed in the refrigerator 110. The camera is configured to acquire an image inside the refrigerator.

The refrigerator 110 is connected to the home gateway device 120 via a wired or wireless network.

The home gateway device 120 may be a router or a device with an activated router function. The home gateway device 120 is configured to receive information sent from the refrigerator 110, and send the information received to the background server 130 corresponding to the refrigerator 110.

The home gateway device 120 is connected to the background server 130 via a wireless network.

The background server 130 may be one server, or may be a server cluster consisting of several servers. The background server 130 is configured to receive the information sent from the refrigerator 110 via the home gateway device 120, and send the information to the terminal 140 bound to the refrigerator 110.

The background server 130 is connected to the terminal 140 via a wireless network.

The terminal 140 may be an electronic device with functions of data processing and displaying, which may be a smart phone, a tablet computer, a smart TV, a wearable device or a personal computer. It should be noted that, the terminal 140 and the refrigerator 110 are bound in advance. Alternatively, the terminal 140 and the home gateway device 120 may also be connected via a wired or wireless network.

The method for generating information provided by various aspects of the present disclosure may be executed by the background server 130 or the terminal 140, and may also be executed by a processor in the refrigerator 110 if provided, which is not limited by the present disclosure.

For the purpose of descriptive convenience, in the following aspects, the method for generating information executed on the terminal 140 is taken as an example for explanation, but is not construed to limit the present disclosure.

Figure 2:
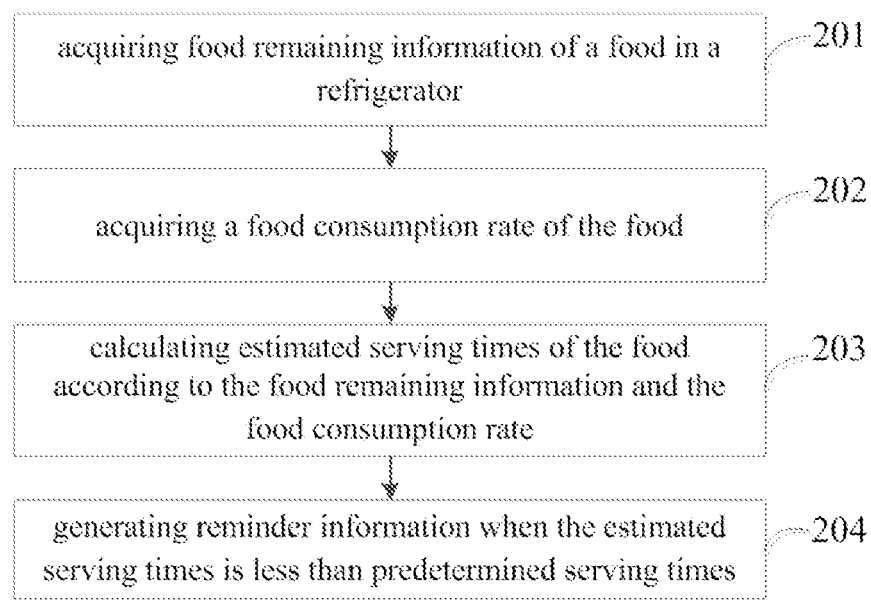
FIG. 2 is a flow chart showing a method for generating information according to an exemplary aspect of the present disclosure.

FIG. 2 is a flow chart showing a method for generating information according to an illustrative aspect. In this aspect, the method for generating information executed on the terminal 140 shown in FIG. 1 is illustrated. The method for generating information may include the following steps.

In step 201, food remaining information of a food in a refrigerator is acquired.

In step 202, a food consumption rate of the food is acquired.

In step 203, estimated serving times of the food is calculated according to the food remaining information and the food consumption rate.

In step 204, reminder information is generated when the estimated serving times is less than predetermined serving times.

Above all, with the method for generating information provided by the present aspect, the serving times of the food in the refrigerator is estimated according to the food remaining information of the food in the refrigerator and the food consumption rate corresponding to the food, and the reminder information is generated to remind the user to purchase the food when the serving times is less than the predetermined serving times. By this means, a problem, that a refrigerator is only used to store food and the user may find that the food in the refrigerator is insufficient when cooking, is solved. The refrigerator may acquire a remaining amount of the food stored in the refrigerator, and may generate the reminder information to remind the user when the remaining amount of the food is insufficient, such that the problem that the user finds that the food in the refrigerator is insufficient when cooking is avoided.

Figure 3A:
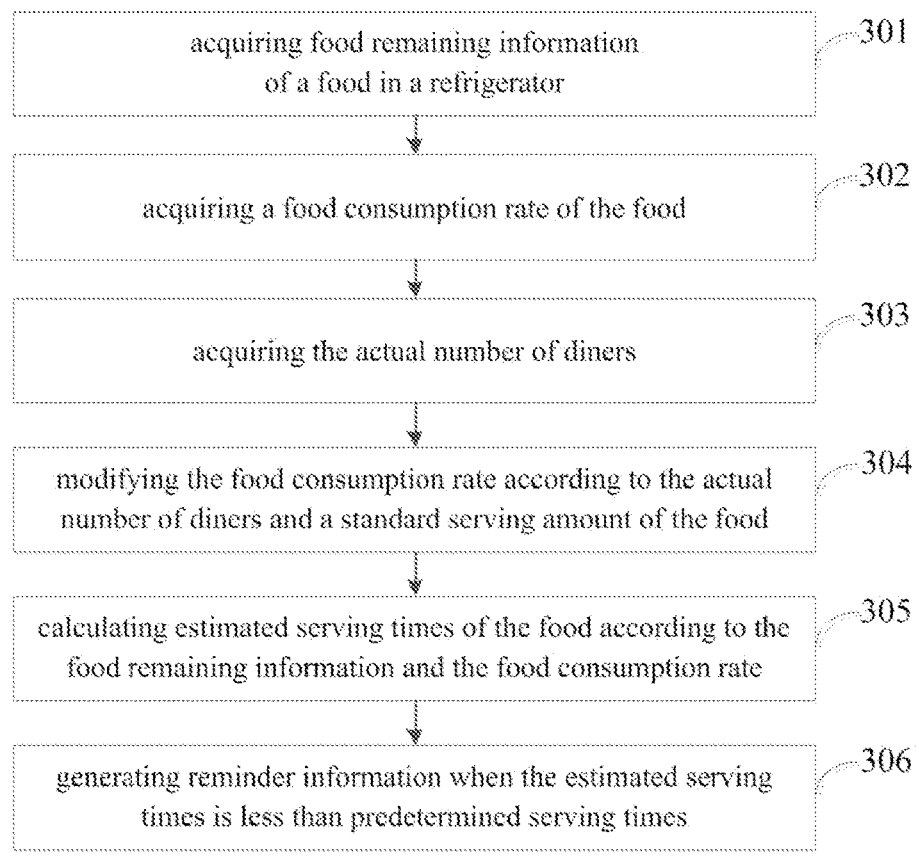
FIG. 3A is a flow chart showing a method for generating information according to another exemplary aspect of the present disclosure.

FIG. 3A is a flow chart showing a method for generating information according to another illustrative aspect. In this aspect, the method for generating information executed on the terminal 140 shown in FIG. 1 is illustrated. The method for generating information may include the following steps.

In step 301, food remaining information of a food in a refrigerator is acquired.

In order to determine whether the food in the refrigerator can satisfy the predetermined serving times, the terminal first needs to get the food remaining information of various foods in the refrigerator. The food remaining information includes but not limited to a type of the food and a remaining amount of the food.

Different foods correspond to different serving manners. Some foods (e.g., mushroom, cauliflower, red bean, barley, etc.) are generally served by weight, while other foods (e.g., apple, watermelon, etc.) are generally served by number. For example, it is generally consumed in grams when a user uses the red beans for cooking, while it is generally consumed in numbers when the user serves the apple. Therefore, different measurement manners may be used by the terminal to determine the remaining amount of the food.

Figure 3B:
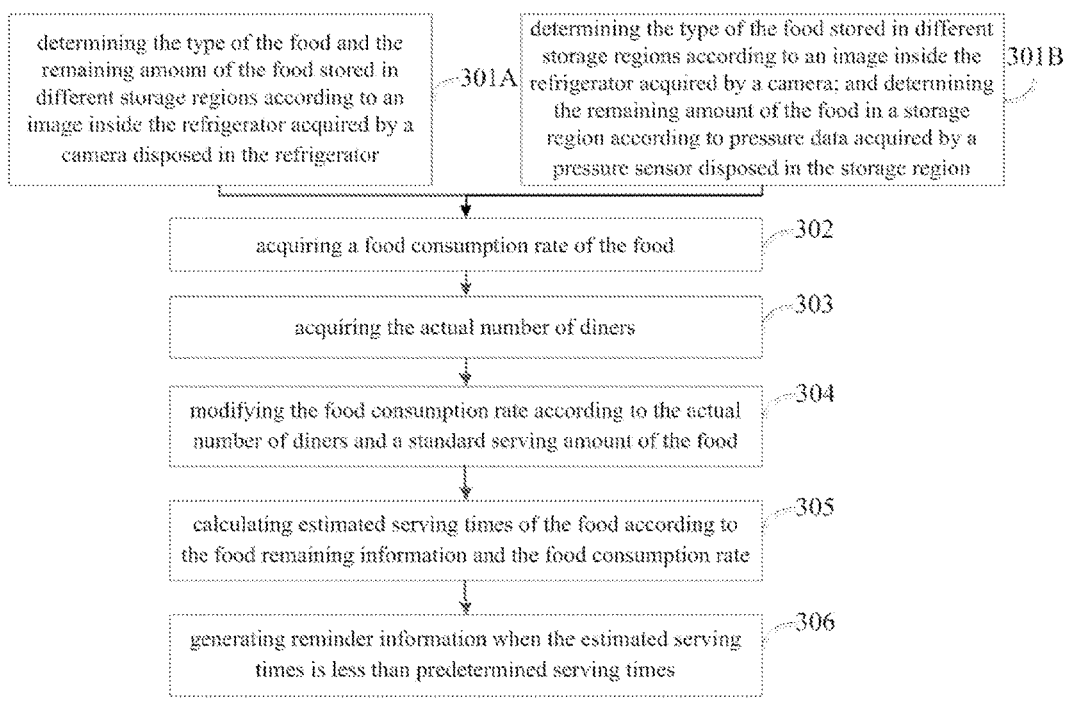
FIG. 3B is a flow chart showing a step for determining food remaining information involved in a method for generating information according to another exemplary aspect of the present disclosure.

When the food is served by weight, the terminal determines a weight of the food as the remaining amount of the food; when the food is served by number, the terminal determines the number of the foods as the remaining amount of the food. As shown in FIG. 3B, this step may include steps 301A and 301B.

In step 301A, the type of the food and the remaining amount of the food stored in different storage regions are determined according to an image inside the refrigerator acquired by a camera disposed in the refrigerator.

The refrigerator acquires the image inside the refrigerator via at least one camera disposed in the refrigerator in advance, and sends the image inside the refrigerator to the background server via the home gateway device, and the background server transmits the image inside the refrigerator to the terminal bound to the refrigerator. After receiving the image inside the refrigerator, the terminal identifies the food in the image so as to determine the type of the food. When it is determined that the food is served by number, the terminal performs a profile analysis on the image corresponding to the food, so as to determine the number of the foods as the remaining amount of the food. Furthermore, since the inside of the refrigerator is divided into different regions, the terminal also needs to determine the storage regions corresponding to various types of foods according to the image inside the refrigerator.

Figure 3C:
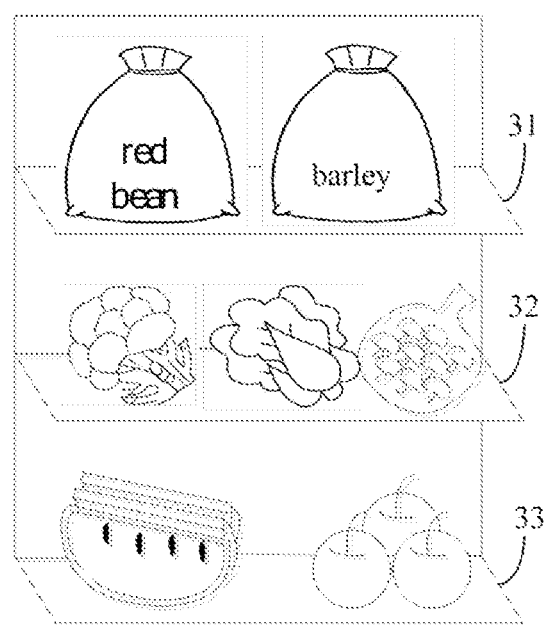
FIG. 3C is a schematic diagram illustrating an image inside a refrigerator involved in a method for generating information according to another exemplary aspect of the present disclosure.

For example, FIG. 3C shows the image inside the refrigerator received by the terminal. After identifying the image, the terminal determines that watermelons and apples are stored in a storage region 33, both served by number; and the terminal further performs a profile analysis on the image to determine that there are 4 pieces of watermelon and 3 apples.

In step 301B, the type of the food stored in different storage regions is determined according to an image inside the refrigerator acquired by a camera; and the remaining amount of the food in a storage region is determined according to pressure data acquired by a pressure sensor disposed in the storage region.

For the food served by weight, it is not available for the terminal to determine a weight of the food according to the image inside the refrigerator acquired by the camera only. In this case, the terminal needs to determine the weight of the food stored in different storage regions according to the image inside the refrigerator and the pressure data acquired by the pressure sensor disposed in respective storage regions.

The inside of the refrigerator is divided into several storage regions. The terminal identifies the foods contained in the image inside the refrigerator after receiving the image inside the refrigerator acquired by the camera, and determines the type of the food stored in different storage regions.

For example, FIG. 3C shows the image inside the refrigerator received by the terminal. The terminal identifies the foods contained in the image inside the refrigerator, and, according to the storage regions divided in advance, determines that the red beans and the barley are stored in a first storage region 31, the cauliflower, green vegetables and the mushrooms are stored in a second storage region 32, and the watermelon and the apples are stored in a third storage region 33.

There is at least one pressure sensor provided in each storage region in the refrigerator, and pressure data acquired by the pressure sensor is the weight of the food stored in the storage region. The refrigerator sends the pressure data acquired to the background server via the home gateway device at each predetermined interval or when detecting a change of the pressure data, and the background server sends the pressure data to the terminal bound to the refrigerator.

A relationship between each pressure sensor and a corresponding storage region thereof is stored in the terminal in advance. When receiving the pressure data from the background server, the terminal may determine the weight of the food stored in different storage regions, i.e., the remaining amount of the food.

It should be noted that, when identifying that there is canned or bottled food (such as bottled paste or bottled drink) stored in the refrigerator according to the image inside the refrigerator, the terminal may identify a capacity of a can/bottle and a level of the food in the can/bottle according to the image, so as to further determine the remaining amount of the food in the can/bottle. Also, the terminal may determine the weight of the food in the can/bottle according to a sum of a weight of the can/bottle and a weight of the food acquired by the pressure sensor and a reference weight of the can/bottle pre-stored, which is not limited by the present disclosure.

It should be also noted that, the number of the cameras disposed inside the refrigerator and a location of the camera are not limited by the present disclosure. In addition, in this aspect, the inside of the refrigerator is divided into three storage regions for illustrative description, and in other possible implementations, each storage region in FIG. 3C may also be re-divided into several storage sub-regions. The division manner for the storage region in the refrigerator is not limited by the present disclosure. In addition, neither the number of the pressure sensors nor a location of the pressure sensor is limited by the present disclosure.

The food remaining information obtained by the terminal according to the image inside the refrigerator shown in FIG. 3C and the corresponding pressure data may be listed in Table One.

TABLE ONE

| type of food | remaining amount of food |
| --- | --- |
| red bean | 1500 g |
| barley | 1500 g |
| cauliflower | 1000 g |
| green vegetable | 1000 g |
| mushroom | 500 g |
| watermelon | 4 pieces |
| apple | 3 |

In the present disclosure, the remaining amount of the food in the refrigerator may be determined by the refrigerator according to the image inside the refrigerator and the pressure data, and be sent to the bound terminal via the background server; or may be determined by the background server according to the image inside the refrigerator and the pressure data sent from the refrigerator and be sent to the bound terminal.

In step 302, a food consumption rate of the food is acquired.

Figure 3D:
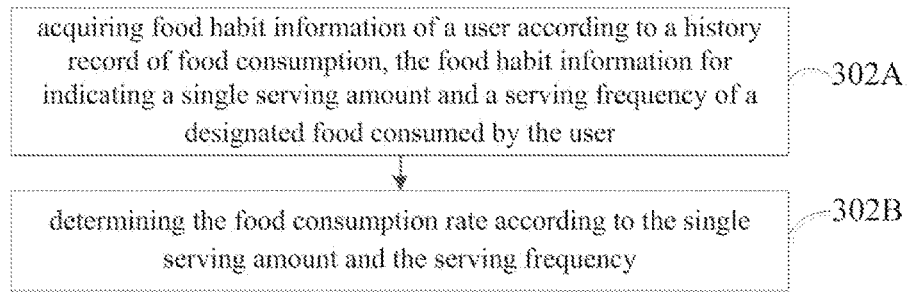
FIG. 3D is a flow chart showing a step for determining a food consumption rate involved in a method for generating information according to another exemplary aspect of the present disclosure.

Because the food consumption rates corresponding to different foods in the refrigerator are different, in order to ensure an accuracy of calculated estimated serving times, the terminal may further acquire food habit information of a user according to a history record of food consumption and may determine the food consumption rates of different foods according to the food habit information. As an impossible implementation, as shown in FIG. 3D, step 302 may include steps 302A and 302B.

In step 302A, the food habit information of the user is acquired according to the history record of food consumption. The food habit information is for use in indicating a single serving amount and a serving frequency of a designated food consumed by the user.

After each time that the user opens the refrigerator, the refrigerator may detect whether the user consumes the food according to the image inside the refrigerator acquired by the camera disposed in the refrigerator and the pressure data acquired by the pressure sensor. When it is detected that the user consumes the food, the refrigerator further determines the type and the serving amount of the food consumed, so as to generate a corresponding history record of food consumption. The process for determining the type and the serving amount of the food consumed is similar to that in step 301 above, which is not elaborated herein. The history record of food consumption may be schematically shown in Table Two.

TABLE TWO

| consuming time | type of food | serving amount |
|---|---|---|
| 2015.8.1 09:05:20 | apple | 1 |
| 2015.8.1 18:05:20 | red bean | 150 g |
| 2015.8.1 18:05:20 | barley | 150 g |
| 2015.8.1 18:05:20 | green vegetable | 200 g |
| 2015.8.1 18:05:20 | cauliflower | 150 g |
| 2015.8.1 20:00:50 | watermelon | 2 pieces |
| 2015.8.2 09:03:20 | apple | 1 |
| 2015.8.2 17:55:20 | red bean | 150 g |
| 2015.8.2 17:55:20 | barley | 150 g |
| 2015.8.2 17:55:20 | mushroom | 100 g |
| 2015.8.2 19:50:30 | watermelon | 2 pieces |

The terminal may determine the food habit information of the user according to the history record of food consumption. For example, the terminal may determines the food habit information of the user according to the history record of food consumption recorded in Table Two, and the food habit information may be stored in a storage structure as shown in Table Three.

TABLE THREE

| type of food | single serving amount | serving frequency |
|---|---|---|
| red bean | 150 g | 1 day/time |
| barley | 150 g | 1 day/time |
| cauliflower | 150 g | 1 day/time |
| green vegetable | 200 g | 2 days/time |
| mushroom | 100 g | 2 days/time |
| watermelon | 2 pieces | 1 day/time |
| apple | 1 | 1 day/time |

In step 302B, the food consumption rate is determined according to the single serving amount and the serving frequency.

Further, the terminal determines the food consumption rate of the designated food consumed by the user according to the single serving amount and the serving frequency.

For example, according to the food habit information as shown in Table Three, the terminal determines that the food consumption rates of the red bean and the barley are 150 g/day, respectively, and the food consumption rate of the mushroom is 100 g/2 days.

In step 303, the actual number of diners is acquired.

Since the number of diners at home is relatively fixed, accordingly, the food consumption rate of the food in the refrigerator is relatively fixed, and thus the user may set the predetermined number of diners, and the food consumption rate determined according to the food habit information of the user is the food consumption rate of the predetermined number of diners. However, when there is a visitor at home or some family member is on a business trip, the actual number of diners will be changed, and the food consumption rate will be changed accordingly. In order to further increase the accuracy of the estimated serving times, the terminal also needs to further acquire the actual number of diners, and modify the food consumption rate according to the actual number of diners. Alternatively, step 303 may include the following five possible implementations.

In a first possible implementation, indoor image information is acquired by a camera, the camera being a home camera bound to the refrigerator or disposed outside the refrigerator; and the actual number of diners is determined according to the indoor image information.

The refrigerator may acquire the indoor image information via the home camera bound to the refrigerator or the camera disposed outside the refrigerator, and may send the indoor image information to the background server via the home gateway device. The background server transmits the indoor image information to the terminal bound to the refrigerator. After receiving the indoor image information, the terminal determines the number of people at home according to the indoor image information and thus determining the actual number of diners.

It should be noted that, after receiving the indoor image information, the terminal may further determine information on sex, age and stature of the actual diner, such that it is convenient to modify the food consumption rate subsequently.

In a second possible implementation, the number of mobile terminals connected to a home gateway device is acquired, and the actual number of diners is determined according to the number of mobile terminals.

Generally, the number of mobile terminals connected to the home gateway device remains unchanged when there is no visitor at home. However, when the user meets a guest at home, the mobile terminal of the guest may be connected to the home gateway device, such that the terminal may determine the actual number of diners according to the number of the mobile terminals connected to the home gateway device.

As a possible implementation, when detecting that the number of the mobile terminals connected to the home gateway device is greater than the predetermined number of the mobile terminals connected to the home gateway device (the predetermined number of the mobile terminals connected to the home gateway device may be the number of mobile terminals connected to the home gateway device in the case of no visitor), the home gateway device sends the current number of the mobile terminals connected to the home gateway device to the terminal, and the terminal determines the actual number of diners according to the current number of the mobile terminals connected to the home gateway device. In order to ensure the accuracy of the actual number of diners, after determining the actual number of diners, the terminal may also send inquiry information to enquire the user whether the actual number of diners is accurate, and modify the actual number of diners according to a feedback from the user.

In addition, the home gateway device may also send identification (ID) of a mobile terminal connected to the background server, and the background server detects whether information of the user corresponding to the mobile terminal has been stored previously, such that it is convenient to modify the food consumption rate subsequently. The information includes the information on sex, age, stature and food habit of the actual diner and the like.

In a third possible implementation, visitor information in a terminal bound to the refrigerator is acquired, the visitor information including at least the number of visitors; the actual number of diners is determined according to the number of visitors.

Generally, the user records the visitor information in a schedule, and the visitor information includes information on the number of visitors and the like. Once detecting that new visitor information is added to the schedule, the terminal bound to the refrigerator acquires the number of visitors included in the visitor information, and determines the actual number of diners according to the number of visitors.

In a fourth possible implementation, travel information in a terminal bound to the refrigerator is acquired, the travel information including at least travel days; and the actual number of diners during the travel days is determined.

Generally, the user records travel information in the schedule, and the travel information includes information on the travel days and the like. During the travel days of the user, the food consumption rate of the food is changed with the change of the actual number of diners, thus affecting calculation for the estimated serving times. Thus, the terminal needs to determine the actual number of diners during the travel days according to the travel days included in the travel information, and modify the food consumption rate during the travel days according to the actual number of diners.

It should be noted that, the visitor information or the travel information above may also be acquired from a message record, an email or an instant communication chat record. The terminal acquiring the visitor information or the travel information above from the schedule is taken as an example for illustration, which is not construed to limit the present disclosure.

In a fifth possible implementation, geographical location information of a mobile terminal bound to the refrigerator during a predetermined period is acquired, the predetermined period being a predetermined cooking period; it is determined that a user corresponding to the mobile terminal is a non-diner when the geographical location information indicates that a distance between the mobile terminal and the refrigerator is greater than a predetermined distance threshold; and the actual number of diners is determined according to the non-diner and the predetermined number of diners.

When it is the predetermined cooking period of the user, the terminal acquires the geographical location information of the mobile terminal bound to the refrigerator, and determines the distance between the user corresponding to the mobile terminal and the refrigerator. When the distance is less than the predetermined distance threshold (e.g., a distance between a company and a home of the user), it is determined that the user will go back home for a dinner; and when the distance is greater than the predetermined distance threshold, it is indicated that the user works overtime, and thus it is determined that the user is a non-diner. The terminal determines the actual number of diners according to the number of the non-diners and the predetermined number of diners, and modifies the food consumption rate according to the actual number of diners.

For example, the user predetermines that the number of diners is 3 people and the number of the non-diners is 1 person, then the terminal determines that the actual number of diners is 2 people.

In step 304, the food consumption rate is modified according to the actual number of diners and a standard serving amount of the food.

The terminal calculates a difference between the actual number of diners and the predetermined number of diners, and modifies the food consumption rate according to the difference and the standard serving amount of the food.

For example, if the terminal acquires that the actual number of diners is 7 people and the predetermined number of diners is 3 people, then the difference is 4 people. For the red bean, a standard serving amount thereof is 50 g/person/day, and the food consumption rate for the predetermined number of diners is 150 g/day, and thus a modified food consumption rate for the red bean is 150+4×50=350 g/day.

For another example, the terminal acquires that the actual number of diners is 2 people for the coming 4 days, while the predetermined number of diners is 3 people, thus the calculated difference is 1 person. For the red bean, a standard serving amount thereof is 50 g/person/day, and the food consumption rate for the predetermined number of diners is 150 g/day, that is, the food consumption rate for the red bean is 150−1×50=100 g/day during each of these 4 days.

It should be noted that, in step 303 above, the terminal may further determine information on stature, age, sex and food habit of the actual diner; determine a standard serving amount of individual diner according to the information; and dynamically modify the food consumption rate, thus improving the accuracy of the modified food consumption rate.

In step 305, the estimated serving times of the food is calculated according to the food remaining information and the food consumption rate.

If the food remaining information acquired by the terminal is m, and the modified food consumption rate is n, then the estimated serving times of the food is [m/n].

It should be noted that, in the third possible implementation mentioned in step 303 above, the visitor information also includes a visiting hour. When calculating the estimated serving times of the food, the terminal needs to determine an estimated remaining amount of the food in the refrigerator at the visiting hour according to a current time and the visiting hour, and determine the estimated serving times of the food in the refrigerator according to the estimated remaining amount of the food.

For example, the terminal calculates that an interval between the visiting hour and the current time is 3 days, the remaining amount of the green vegetable in the refrigerator is 1000 grams, the consumption rate of the green vegetable with the predetermined number of diners is 200 g/day/time, and the consumption rate of the green vegetable with the actual number of diners is 500 g/time. The terminal calculates that when the visiting hour is reached, the estimated food remaining amount of the green vegetable is 1000−3×200=400 g, and the estimated serving times of the green vegetable at the visiting hour is [400/500]=0.

In step 306, reminder information is generated when the estimated serving times is less than predetermined serving times.

When the calculated estimated serving times is less than the predetermined serving times, the terminal generates and displays the reminder information. Alternatively, if the refrigerator is provided with a display screen, the terminal may also send the reminder information to the refrigerator via the background server, such that it is convenient for the user to know a lack of food in the refrigerator.

Alternatively, after determining the actual number of diners, the terminal further needs to detect whether the difference between the actual number of diners and the predetermined number of diners is greater than a predetermined threshold. If the difference is greater than the predetermined threshold, a visiting mode is entered, and the predetermined serving times is adjusted. For example, if the terminal detects that the actual number of diners is 6 people, the predetermined number of diners is 3 people, and the difference between the actual number of diners and the predetermined number of diners is 3 people (3 is larger than the predetermined threshold 2), then the visiting mode is entered, and the predetermined serving times is adjusted as 1, indicating that the foods in the refrigerator satisfy a food amount required for this visiting, that is, none reminder information is required to generate.

Figure 3E:
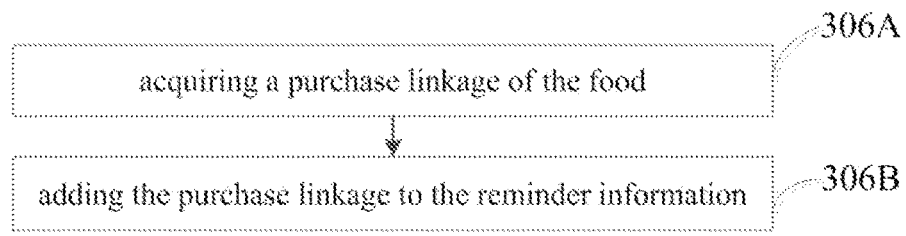
FIG. 3E is a flow chart showing a step for generating reminder information involved in a method for generating information according to another exemplary aspect of the present disclosure.

In order to facilitate the user to supply food in time, when detecting the lack of food, the terminal further acquires a purchase linkage (e.g., online purchasing information including price) of the food, and adds the purchase linkage to the reminder information. As shown in FIG. 3E, step 306 may include steps 306A and 306B.

In step 306A, the purchase linkage of the food is acquired.

The terminal acquires at least two prices for the food, compares these prices and acquires a purchase linkage corresponding to the lowest price. It should be noted that, the terminal may also acquire a corresponding purchase linkage according to a sales volume of the food or a degree of good comments, which is not limited by the present disclosure.

In step 306B, the purchase linkage is added to the reminder information.

The terminal adds the purchase linkage acquired to the reminder information and reminds the user to purchase.

Figure 3F:
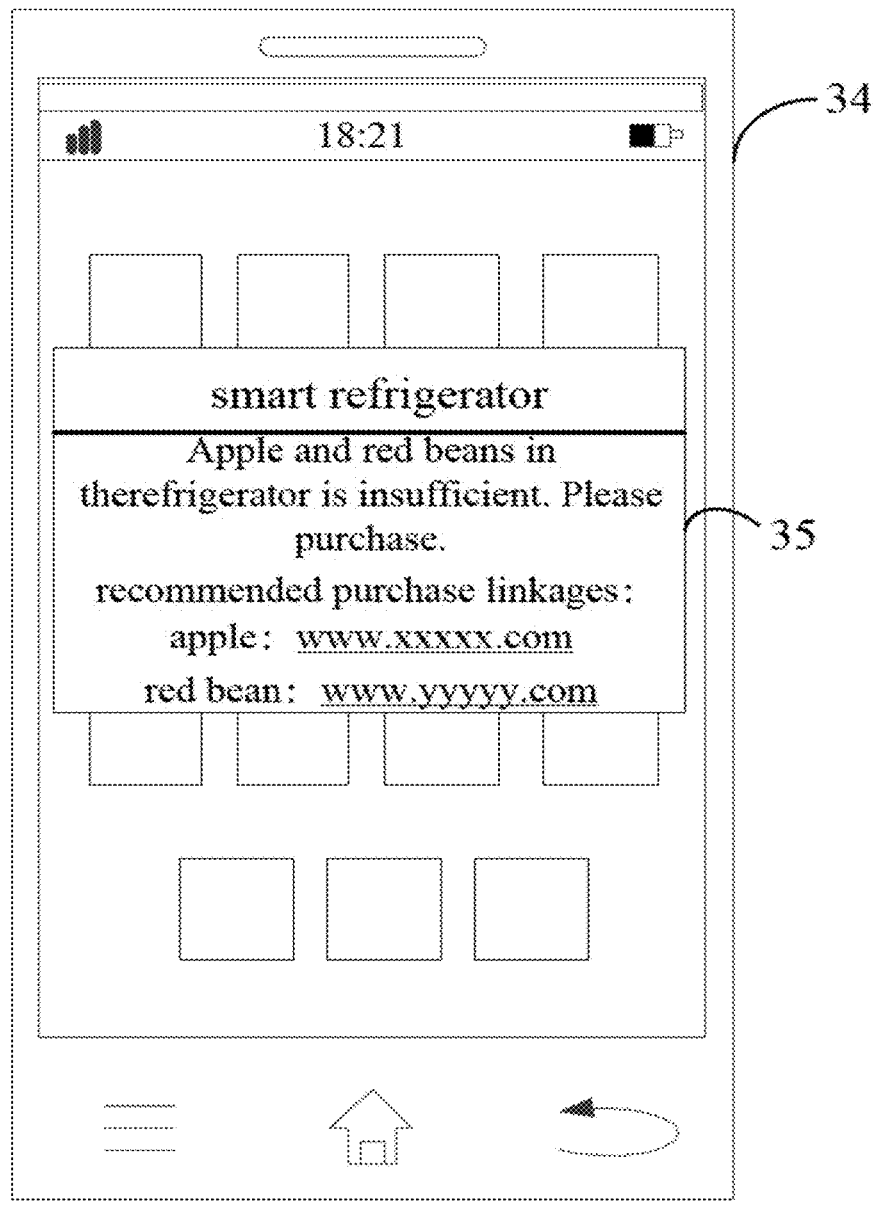
FIG. 3F is a schematic diagram illustrating an implementation of a method for generating information according to another illustrative aspect.

As shown in FIG. 3F, if the terminal 34 detects that the remaining amounts of the apples and the red bean in the refrigerator are insufficient, corresponding reminder information 35 is generated to remind the user to supply as soon as possible. The reminder information 35 further includes the purchase linkages of the apples and the red bean.

Above all, with the method for generating information, the serving times of the food in the refrigerator is estimated according to the food remaining information of the food in the refrigerator and the food consumption rate corresponding to the food, and the reminder information is generated to remind the user to purchase the food when the serving times is less than the predetermined serving times. By this means, a problem, that a refrigerator is only used to store food and the user may find that the food in the refrigerator is insufficient when cooking, is solved. The refrigerator may acquire the remaining amount of the food stored in the refrigerator, and may generate the reminder information to remind the user when the remaining amount of the food is insufficient, such that the problem that the user finds that the food in the refrigerator is insufficient when cooking is avoided.

In the present aspect, the terminal determines the type of the food and the remaining amount of the food stored in the respective storage regions according to the image inside the refrigerator and the pressure data acquired by the pressure sensors in the respective storage regions, thus improving the accuracy of the food remaining information acquired.

In the present aspect, the terminal acquires the food habit information of the user according to the history record of food consumption, and further determines the food consumption rate according to the food habit information, thus improving the accuracy of the estimated serving times of the food obtained by calculation.

In the present aspect, the terminal determines the actual number of diners by means of analyzing the indoor image information, the number of mobile terminals connected, the visitor information, the travel information or the geographical location information, and modifies the food consumption rate according to the actual number of diners, thus further improving the accuracy of the estimated serving times of the food.

In the present aspect, if the terminal detects that the remaining amounts of the food in the refrigerator is insufficient, the reminder information is generated to remind the user to supply as soon as possible, and the purchase linkage corresponding to the food is added to the reminder information so as to facilitate the user to purchase.

Figure 3G:
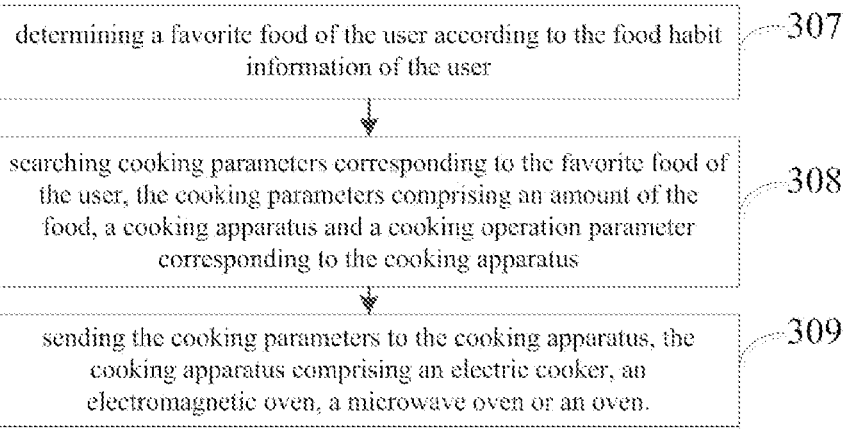
FIG. 3G is a flow chart showing a process for sending cooking parameters involved in a method for generating information according to another exemplary aspect of the present disclosure.

In order to connect other cooking apparatuses at home, after acquiring the food habit information of the user according to the history record of food consumption, the terminal may further determine a favorite food of the user according to the food habit information of the user, and send the cooking parameters corresponding to the favorite food to the cooking apparatus at home, thus facilitating the user to cook the favorite food. As shown in FIG. 3G, the method may further include the following steps.

In step 307, a favorite food of the user is determined according to the food habit information of the user.

As a possible implementation, the terminal may determine the food with a serving frequency greater than a predetermined frequency threshold as the favorite food of the user.

For example, the predetermined frequency threshold is 1 day/time, the terminal determines the red bean, the barley, the watermelon and the apple as the favorite food of the user according to the food habit information as shown in Table Three.

In step 308, cooking parameters corresponding to the favorite food of the user is searched. The cooking parameters include an amount of the food, a cooking apparatus and a cooking operation parameter corresponding to the cooking apparatus.

For example, the terminal gets that the favorite food of the user is red bean and the barley, and searches that the cooking apparatus applied for cooking red beans and barley porridge is an electric cooker, the food amounts are 150 g of red beans, 150 g of barley and 300 g of water, and searches a power curve of the electric cooker during cooking.

In step 309, the cooking parameters are sent to the cooking apparatus. The cooking apparatus includes an electric cooker, an electromagnetic oven, a microwave oven or an oven.

After searching the corresponding cooking parameters, the terminal detects whether a corresponding cooking apparatus is bounded thereto, if yes, the terminal sends the cooking parameters to the corresponding cooking apparatus. When using the cooking apparatus to cook subsequently, the user may cook according to the cooking operation parameter included in the cooking parameters, thus greatly improving an efficiency of cooking for the user.

It should be noted that, after determining the favorite food of the user, the terminal may thawing the food or other operations in advance according to the predetermined cooking period, thus facilitating the user to directly consume and cook the food.

In the present aspect, the terminal determines the favorite food of the user according to the food habit information of the user, and sends the cooking parameters to the cooking apparatus at home, thus greatly improving the efficiency of cooking for the user.

Since the storage duration of the food stored in the refrigerator is limited, in order to avoid the food from deterioration, when acquiring the food remaining information of the food, the refrigerator may also acquire food storage states of different foods and generate corresponding reminder information to remind the user to serve or clear up as soon as possible.

In a first possible implementation, actual storage duration of the food is acquired; serving reminder information is generated for reminding the user to serve the food as soon as possible when the actual storage duration reaches recommended storage duration corresponding to the food.

When detecting that there is a new food being stored, the refrigerator automatically records a deposit time of the food, and sends the deposit time to the terminal bound to the refrigerator. The terminal determines actual storage duration of the food according to the deposit time and the current time. According to the type of the food acquired in step 301, the terminal may further acquire recommended storage duration of the food, and generates the serving reminder information for reminding the user to serve the food as soon as possible when the actual storage duration reaches the recommended storage duration.

Figure 3H:
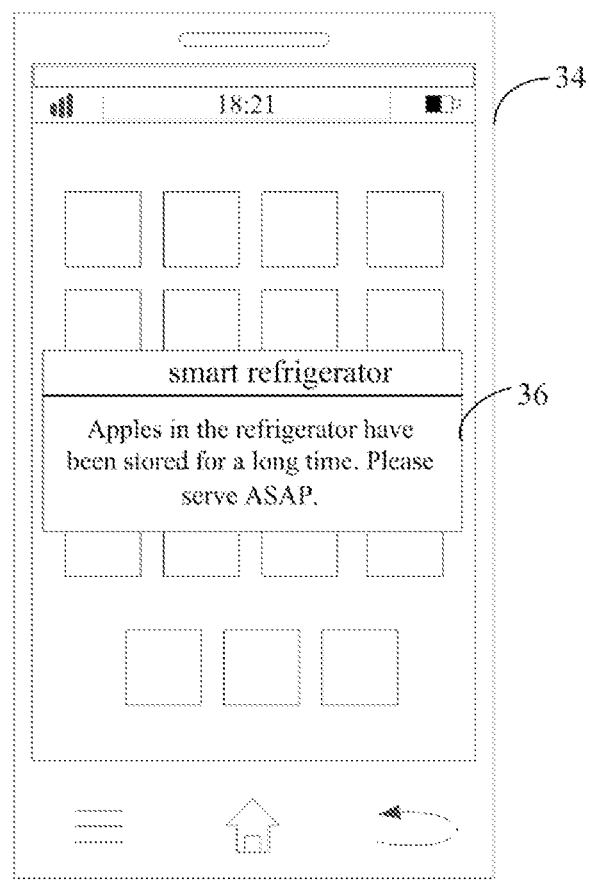
FIG. 3H is a schematic diagram illustrating an implementation of a method for generating information according to another exemplary aspect of the present disclosure.

As shown in FIG. 3H, the terminal 34 detects that the actual storage duration of the apple in the refrigerator reaches corresponding recommended storage duration, serving reminder information 36 is generated to remind the user to serve as soon as possible.

In a second possible implementation, a storage state of the food is determined via a camera or a smell sensor built in the refrigerator; and food clean-up information is generated for reminding the user to clean up the food when the storage state indicates that the food is deteriorated.

The terminal may also determine the storage state of the food by an appearance of the food acquired by the camera in the refrigerator or by a smell of the food acquired by a smell sensor in the refrigerator.

As a possible implementation, the terminal stores deteriorated characteristic information corresponding to all kinds of foods. The deteriorated characteristic information includes an appearance characteristic and a smell characteristic, etc. For example, an appearance characteristic corresponding to a deteriorated banana is lots of blackspots appearing on its surface; and a smell characteristic corresponding to a deteriorated egg is a smell of hydrogen sulfide gas giving out a rotten egg smell. The terminal determines the storage state of the food according to the food appearance and/or the food smell. When the food appearance and/or the food smell indicate(s) that the food is deteriorated, the food clean-up information is generated to remind the user to clean up the food.

In the present aspect, the terminal determines whether the food needs to be served as soon as possible according to the actual storage duration of the food or the storage state of the food, and generates the corresponding serving reminder information or the food clean-up information for reminding a user to serve or clean up the food as soon as possible, such that a fact, that the food is deteriorated because the user does not know the storage state of the food in the refrigerator, is avoided.

The following device aspects of the present disclosure may be used to perform the method aspects of the present disclosure. Concerning details not disclosed in the device aspects of the present disclosure, reference is made to the method aspects of the present disclosure.

Figure 4:
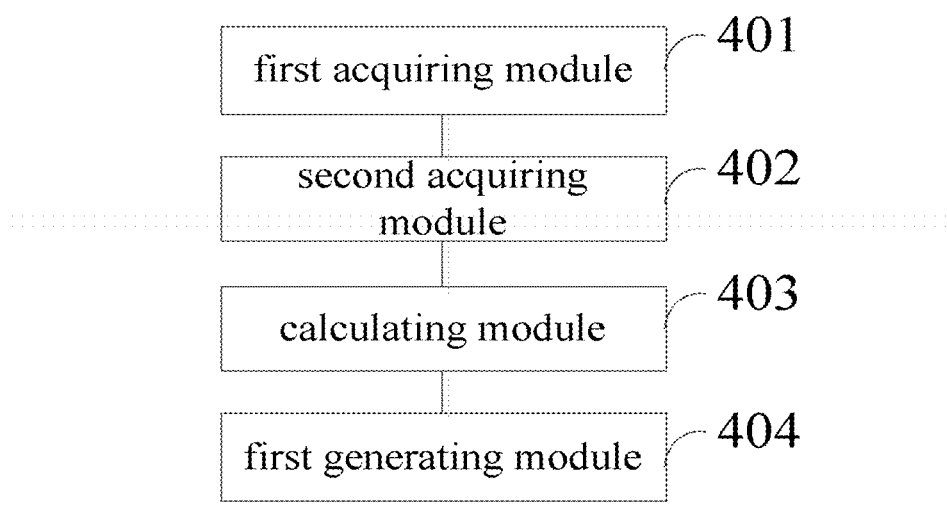
FIG. 4 is a block diagram illustrating a device for generating information according to an exemplary aspect of the present disclosure.

FIG. 4 is a block diagram illustrating a device for generating information according to an illustrative aspect. The device for generating information may be implemented as all or part of the terminal 140 in FIG. 1 by software, hardware or a combination thereof. The device for generating information may include:

a first acquiring module 401, configured to acquire food remaining information of a food in a refrigerator;

a second acquiring module 402, configured to acquire a food consumption rate of the food;

a calculating module 403, configured to calculate estimated serving times of the food according to the food remaining information and the food consumption rate; and a first generating module 404, configured to generate reminder information when the estimated serving times is less than predetermined serving times.

Above all, with the device for generating information provided by the aspect, the serving times of the food in the refrigerator is estimated according to the food remaining information of the food in the refrigerator and the food consumption rate corresponding to the food, and the reminder information is generated to remind the user to purchase the food when the serving times is less than the predetermined serving times. By this means, a problem, that a refrigerator is only used to store food and the user may find that the food in the refrigerator is insufficient when cooking, is solved. The refrigerator may acquire the remaining amount of the food stored in the refrigerator, and may generate the reminder information to remind the user when the remaining amount of the food is insufficient, such that the problem that the user finds that the food in the refrigerator is insufficient when cooking is avoided.

Figure 5:
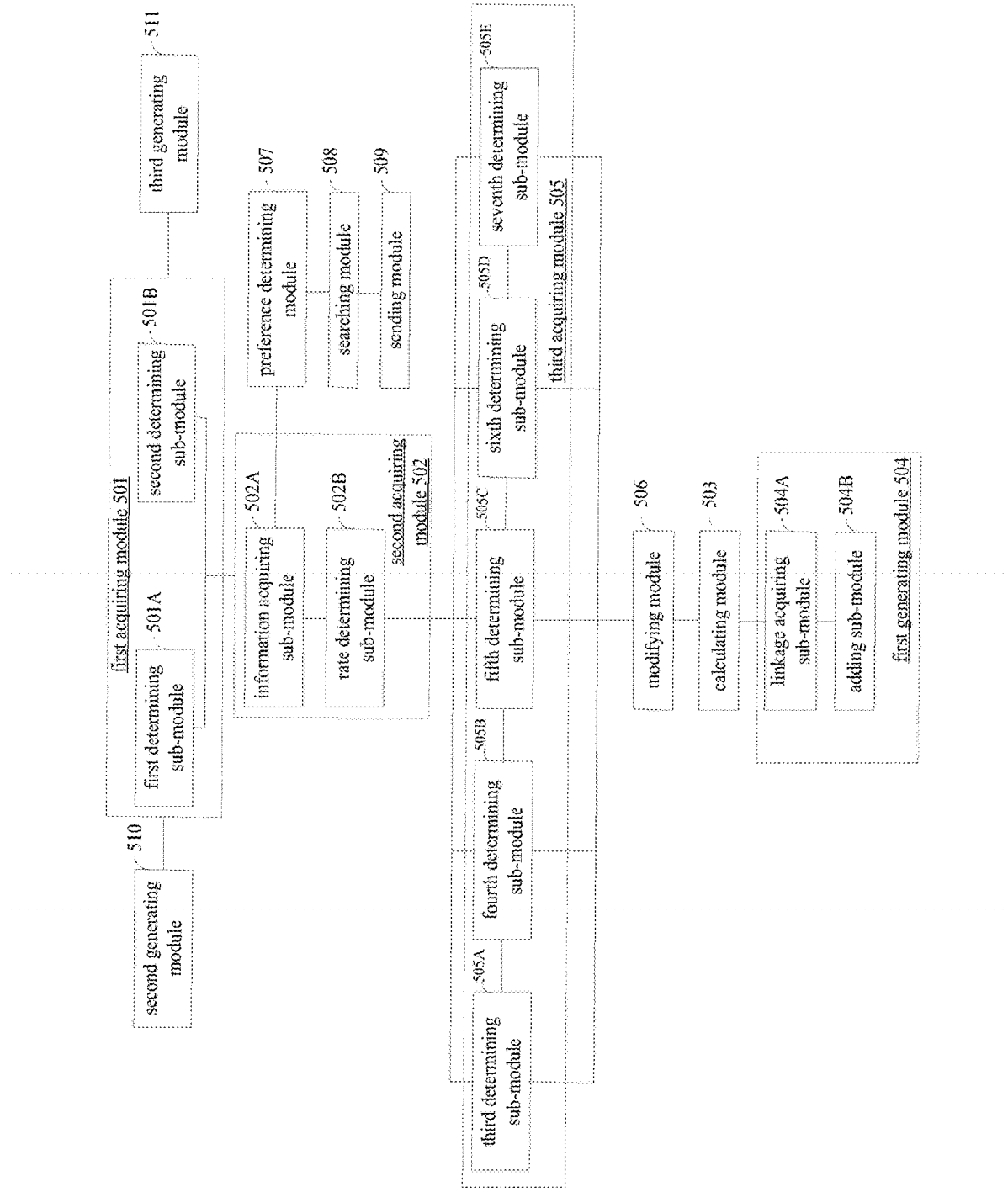
FIG. 5 is a block diagram illustrating a device for generating information according to another exemplary aspect of the present disclosure.

FIG. 5 is a block diagram illustrating a device for generating information according to another illustrative aspect. The device for generating information may be implemented as all or part of the terminal 140 in FIG. 1 by software, hardware or a combination thereof. The device for generating information may include:

a first acquiring module 501, configured to acquire food remaining information of a food in a refrigerator;

a second acquiring module 502, configured to acquire a food consumption rate of the food;

a calculating module 503, configured to calculate estimated serving times of the food according to the food remaining information and the food consumption rate; and a first generating module 504, configured to generate reminder information when the estimated serving times is less than predetermined serving times.

Alternatively, the food remaining information includes a type of the food and a remaining amount of the food; the first acquiring module 501 includes:

a first determining sub-module 501A, configured to determine the type of the food and the remaining amount of the food stored in different storage regions according to an image inside the refrigerator acquired by a camera disposed in the refrigerator;

or a second determining sub-module 501B, configured to determine the type of the food stored in different storage regions according to an image inside the refrigerator acquired by a camera; and determine the remaining amount of the food in a storage region according to pressure data acquired by a pressure sensor disposed in the storage region.

Alternatively, the second acquiring module 502 includes:

an information acquiring sub-module 502A, configured to acquire food habit information of a user according to a history record of food consumption, the food habit information for use in indicating a single serving amount and a serving frequency of a designated food consumed by the user; and a rate determining sub-module 502B, configured to determine the food consumption rate according to the single serving amount and the serving frequency.

Alternatively, the device further includes:

a third acquiring module 505, configured to acquire the actual number of diners; and a modifying module 506, configured to modify the food consumption rate according to the actual number of diners and a standard serving amount of the food.

Alternatively, the third acquiring module 505 includes:

a third determining sub-module 505A, configured to acquire indoor image information acquired by a camera, the camera being a home camera bound to the refrigerator or disposed outside the refrigerator; and determine the actual number of diners according to the indoor image information;

or a fourth determining sub-module 505B, configured to acquire the number of mobile terminals connected to a home gateway device; and determine the actual number of diners according to the number of mobile terminals;

or a fifth determining sub-module 505C, configured to acquire visitor information in a terminal bound to the refrigerator, the visitor information including at least the number of visitors; and determine the actual number of diners according to the number of visitors;

or a sixth determining sub-module 505D, configured to acquire travel information in a terminal bound to the refrigerator, the travel information including at least travel days; and determine the actual number of diners during the travel days;

or a seventh determining sub-module 505E, configured to acquire geographical location information of a mobile terminal bound to the refrigerator during a predetermined period, the predetermined period being a predetermined cooking period; determine that a user corresponding to the mobile terminal is a non-diner when the geographical location information indicates that a distance between the mobile terminal and the refrigerator is greater than a predetermined distance threshold; and determine the actual number of diners according to the non-diner and the predetermined number of diners.

Alternatively, the first generating module 504 includes:

a linkage acquiring sub-module 504A, configured to acquire a purchase linkage of the food; and an adding sub-module 504B, configured to add the purchase linkage to the reminder information.

Alternatively, the device further includes:

a preference determining module 507, configured to determine a favorite food of the user according to the food habit information of the user;

a searching module 508, configured to search cooking parameters corresponding to the favorite food of the user, the cooking parameters including an amount of the food, a cooking apparatus and a cooking operation parameter corresponding to the cooking apparatus; and a sending module 509, configured to send the cooking parameters to the cooking apparatus, the cooking apparatus including an electric cooker, an electromagnetic oven, a microwave oven or an oven.

Alternatively, the device further includes:

a second generating module 510, configured to acquire actual storage duration of the food; and generate serving reminder information for reminding a user to serve the food as soon as possible when the actual storage duration reaches recommended storage duration corresponding to the food;

or a third generating module 511, configured to determine a storage state of the food via a camera or a smell sensor built in the refrigerator; and generate food clean-up information for reminding a user to clean up the food when the storage state indicates that the food is deteriorated.

Above all, with the device for generating information provided by the aspect, the serving times of the food in the refrigerator is estimated according to the food remaining information of the food in the refrigerator and the food consumption rate corresponding to the food, and the reminder information is generated to remind the user to purchase the food when the serving times is less than the predetermined serving times. By this means, a problem, that a refrigerator is only used to store food and the user may find that the food in the refrigerator is insufficient when cooking, is solved. The refrigerator may acquire the remaining amount of the food stored in the refrigerator, and may generate the reminder information to remind the user when the remaining amount of the food is insufficient, such that the problem that the user finds that the food in the refrigerator is insufficient when cooking is avoided.

In the present aspect, the terminal determines the type of the food and the remaining amount of the food stored in the respective storage regions according to the image inside the refrigerator and the pressure data acquired by the pressure sensors in the respective storage regions, thus improving the accuracy of the food remaining information acquired.

In the present aspect, the terminal acquires the food habit information of the user according to the history record of food consumption, and further determines the food consumption rate according to the food habit information, thus improving the accuracy of the estimated serving times of the food obtained by calculation.

In the present aspect, the terminal determines the actual number of diners by analyzing the indoor image information, the number of mobile terminals connected, the visitor information, the travel information or the geographical location information, and modifies the food consumption rate according to the actual number of diners, thus further improving the accuracy of the estimated serving times of the food.

In the present aspect, if the terminal detects that the remaining amounts of the food in the refrigerator is insufficient, the reminder information is generated to remind the user to supply as soon as possible, and the purchase linkage corresponding to the food is added to the reminder information so as to facilitate the user to purchase.

In the present aspect, the terminal determines the favorite food of the user according to the food habit information of the user, and sends the cooking parameters to the cooking apparatus at home, thus greatly improving the efficiency of cooking for the user.

In the present aspect, the terminal determines whether the food needs to be served as soon as possible according to the actual storage duration of the food or the storage state of the food, and generates the corresponding serving reminder information or the food clean-up information for reminding a user to serve or clean up the food as soon as possible, such that a fact, that the food is deteriorated because the user does not know the storage state of the food in the refrigerator, is avoided.

With respect to the devices in the above aspects, the specific manners for performing operations for individual modules therein have been described in detail in the aspects regarding the methods, which will not be elaborated herein.

Figure 6:
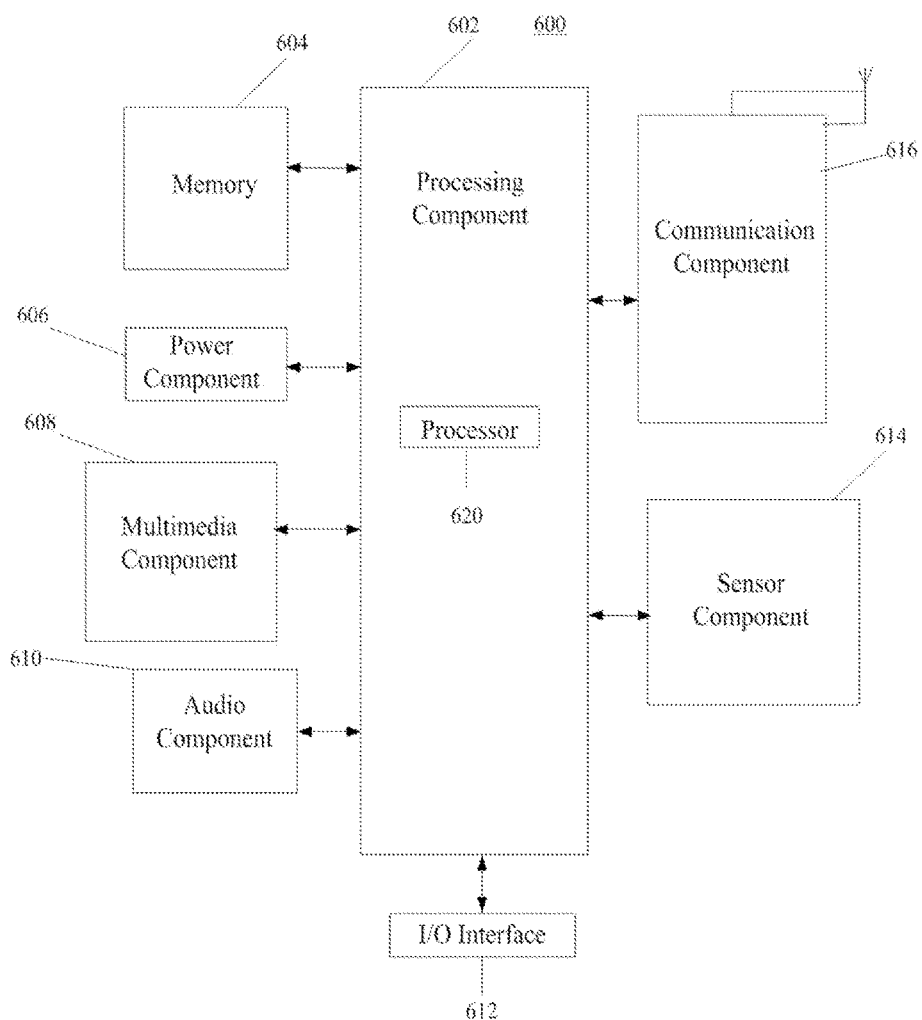
FIG. 6 is a block diagram illustrating a device for generating information according to an exemplary aspect of the present disclosure.

FIG. 6 is a block diagram of a device 600 for generating information according to an illustrative aspect. For example, the device 600 may be a refrigerator 110 or a terminal 140 in FIG. 1.

Referring to FIG. 6, the device 600 may include one or more of the following components: a processing component 602, a memory 604, a power component 606, a multimedia component 608, an input/output (I/O) interface 612, a sensor component 614, and a communication component 616. Alternatively, if the device 600 is the terminal, the device 600 may further include an audio component 610.

The processing component 602 typically controls overall operations of the device 600. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 608 includes at least one camera. The camera may receive an external multimedia datum while the device 600 is in an operation mode. The camera may be a fixed optical lens system or have focus and optical zoom capability. It should be noted that, if the device 600 is a refrigerator, the cameras are disposed outside and inside the refrigerator for acquiring an indoor image and an image inside the refrigerator, respectively.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal may be further stored in the memory 604 or transmitted via the communication component 616. In some aspects, the audio component 610 further includes a speaker to output audio signals.

The I/O interface 612 provides an interface between the processing component 602 and peripheral interface modules, such as a keyboard, buttons, and the like.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user being in contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. If the device 600 is a terminal, the sensor component 614 may also include an accelerometer sensor, a gyroscope sensor, a magnetic sensor, a pressure sensor, or a temperature sensor. If the device 600 is a refrigerator, the sensor component 614 may also include a smell sensor and pressure sensor disposed in respective storage regions of the refrigerator.

The communication component 616 is configured to facilitate communication, wired or wirelessly, between the device 600 and other devices. The device 600 can access a wireless network based on a communication standard, such as WiFi, 2G, or 3G, or a combination thereof. In an illustrative aspect, the communication component 616 receives a broadcast signal or broadcast associated information from an external broadcast management system via a broadcast channel. In an illustrative aspect, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative aspects, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In illustrative aspects, there is also provided a non-transitory computer-readable storage medium including instructions, such as included in the memory 604, executable by the processor 620 in the device 600, for performing the above-described methods. For example, the non-transitory computer-readable storage medium may be a read-only memory (ROM), a random access memory (RAM), a compact disc read-only memory (CD-ROM), a magnetic tape, a floppy disc, an optical data storage device, and the like.

A Non-transitory computer-readable storage medium, when instructions in the storage medium is executed by a processor of the device 600, enables the device 600 to execute a method for generating information. The method includes:

acquiring food remaining information of a food in a refrigerator;

acquiring a food consumption rate of the food;

calculating an estimated serving times of the food according to the food remaining information and the food consumption rate; and generating reminder information when the estimated serving times is less than a predetermined serving times.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the precise structures that has been described above and illustrated in the accompanying drawings, and that various modifications and changes can be made without departing from the scope thereof. It is intended that the scope of the disclosure only be limited by the appended claims.

What is claimed is:

1. A method for generating information, comprising:
   acquiring first information related to an amount of at least one food item remaining in a refrigerator;
   acquiring a rate of consumption of the at least one food item;
   acquiring a first number of diners;
   modifying the rate of consumption based on the first number of diners and a standard serving amount of the at least one food item;
   calculating a number of meal servings of the at least one food item based on the first information and the rate of consumption; and
   generating a reminder message when the number of meal servings is less than a threshold number of meal servings.

2. The method of claim 1, wherein the first information related to the amount of the at least one food item includes a type of the at least one food item and the amount of the at least one food item remaining in the refrigerator; and
   wherein acquiring the first information includes:
      determining the type of the at least one food item based on an image from inside the refrigerator acquired by a camera disposed in the refrigerator; and
      determining the amount of the at least one food item stored in at least one storage region of the refrigerator based on one or more of (i) the image from inside the refrigerator acquired by the camera, and (ii) pressure data acquired by a pressure sensor disposed in the at least one storage region.

3. The method of claim 2, wherein acquiring the rate of consumption includes:
   acquiring habit information of a user based on a history record of food consumption, the habit information indicating a single serving amount and a serving frequency of a designated food consumed by the user; and
   determining the rate of consumption based on the single serving amount and the serving frequency.

4. The method of claim 1, wherein acquiring the rate of consumption includes:
   acquiring habit information of a user based on a history record of food consumption, the habit information indicating a single serving amount and a serving frequency of a designated food consumed by the user; and
   determining the rate of consumption based on the single serving amount and the serving frequency.

5. The method of claim 4, further comprising:
   determining a preferred food item of the user based on the habit information of the user;
   searching cooking parameters based on the preferred food item of the user, the cooking parameters including an amount of the preferred food item, a cooking apparatus, and a cooking operation parameter based on the cooking apparatus; and
   sending the cooking parameters to the cooking apparatus, the cooking apparatus being one of an electric cooker, an electromagnetic oven, a microwave oven, and an oven.

6. The method of claim 1, wherein acquiring the first number of diners includes at least one of:
   a first manner of acquiring the first number of diners by (i) acquiring diner information from an image acquired by a camera, the camera being attached to the refrigerator or disposed outside of the refrigerator, and (ii) determining the first number of diners based on the diner information;
   a second manner of acquiring the first number of diners by (i) acquiring a number of mobile terminals connected to a home gateway device, and (ii) determining the first number of diners based on the number of mobile terminals;
   a third manner of acquiring the first number of diners by (i) acquiring visitor information in a terminal attached to the refrigerator, the visitor information including at least a number of visitors, and (ii) determining the first number of diners based on the number of visitors;
   a fourth manner of acquiring the first number of diners by (i) acquiring travel information in a terminal attached to the refrigerator, the travel information including a travel schedule, and (ii) determining the first number of diners based on the travel schedule; and
   a fifth manner of acquiring the first number of diners by (i) acquiring geographical location information of a mobile terminal attached to the refrigerator during a time period, the time period being a cooking period, (ii) determining that a user associated with the mobile terminal is a non-diner when the geographical location information indicates that a distance between the mobile terminal and the refrigerator is greater than a threshold distance, and (iii) determining the first number of diners based on the non-diner and a predetermined number of diners.

7. The method of claim 1, wherein generating the reminder message includes:

acquiring price information associated with the at least one food item; and adding the price information to the reminder message.

8. The method of claim 1, further comprising:

acquiring a first storage duration of the at least one food item; and generating a serving reminder message for reminding a user to serve the at least one food item when the first storage duration reaches a threshold storage duration associated with the at least one food item.

9. The method of claim 1, further comprising:

determining a storage state of the at least one food item via at least one of a camera and an odor sensor; and generating a clean-up reminder message for reminding a user to clean out the at least one food item when the storage state indicates that the at least one food item has expired.

10. A device for generating information, comprising:

a processor; and a memory for storing instructions executable by the processor, wherein the processor is configured to:

acquire first information related to an amount of at least one food item remaining in a refrigerator;

acquire a rate of consumption of the at least one food item;

acquire a first number of diners;

modify the rate of consumption based on the first number of diners and a standard serving amount of the at least one food item;

calculate a number of meal servings of the at least one food item based on the first information and the rate of consumption; and generate a reminder message when the number of meal servings is less than a threshold number of meal servings.

11. The device of claim 10, wherein the first information related to the amount of the at least one food item includes a type of the at least one food item and the amount of the at least one food item remaining in the refrigerator, and wherein the processor is configured to acquire the first information by:

determining the type of the at least one food item based on an image from inside the refrigerator acquired by a camera disposed in the refrigerator; and determining the amount of the at least one food item stored in at least one storage region of the refrigerator based on one or more of (i) the image from inside the refrigerator acquired by the camera, and (ii) pressure data acquired by a pressure sensor disposed in the storage region.

12. The device of claim 11, wherein the processor is configured to acquire the rate of consumption by:

acquiring habit information of a user based on a history record of food consumption, the habit information indicating a single serving amount and a serving frequency of a designated food consumed by the user; and determining the rate of consumption based on the single serving amount and the serving frequency.

13. The device of claim 10, wherein the processor is configured to acquire the rate of consumption by:

acquiring habit information of a user based on a history record of food consumption, the habit information indicating a single serving amount and a serving frequency of a designated food consumed by the user; and determining the rate of consumption based on the single serving amount and the serving frequency.

14. The device of claim 13, wherein the processor is further configured to:

determine a preferred food item of the user based on the habit information of the user;

search cooking parameters based on the preferred food item of the user, the cooking parameters including an amount of the preferred food item, a cooking apparatus, and a cooking operation parameter based on the cooking apparatus; and send the cooking parameters to the cooking apparatus, the cooking apparatus being one of an electric cooker, an electromagnetic oven, a microwave oven, and an oven.

15. The device of claim 10, wherein the processor is configured to acquire the first number of diners by at least one of:

a first manner of acquiring the first number of diners by (i) acquiring diner information from an image acquired by a camera, the camera being attached to the refrigerator or disposed outside of the refrigerator, and (ii) determining the first number of diners based on the diner information;

a second manner of acquiring the first number of diners by (i) acquiring a number of mobile terminals connected to a home gateway device, and (ii) determining the first number of diners based on the number of mobile terminals;

a third manner of acquiring the first number of diners by (i) acquiring visitor information in a terminal attached to the refrigerator, the visitor information including at least a number of visitors, and (ii) determining the first number of diners based on the number of visitors;

a fourth manner of acquiring the first number of diners by (i) acquiring travel information in a terminal attached to the refrigerator, the travel information including a travel schedule, and (ii) determining the first number of diners based on the travel schedule; and a fifth manner of acquiring the first number of diners by (i) acquiring geographical location information of a mobile terminal attached to the refrigerator during a time period, the time period being a cooking period, (ii) determining that a user associated with the mobile terminal is a non-diner when the geographical location information indicates that a distance between the mobile terminal and the refrigerator is greater than a threshold distance, and (iii) determining the first number of diners based on the non-diner and a predetermined number of diners.

16. The device of claim 10, wherein the processor is configured to generate the reminder message by:

acquiring price information associated with the at least one food item; and adding the price information to the reminder message.

17. The device of claim 10, wherein the processor is further configured to:

acquire a first storage duration of the at least one food item; and generate a serving reminder message for reminding a user to serve the at least one food item when the first storage duration reaches a threshold storage duration associated with the at least one food item.

18. The device of claim 10, wherein the processor is further configured to:

determine a storage state of the at least one food item via at least one of a camera and an odor sensor; and generate a clean-up reminder message for reminding a user to clean out the at least one food item when the storage state indicates that the at least one food item has expired.

* * * * *